(No Model.)
2 Sheets—Sheet 2.
C. A. MAYNARD.
RUBBER TIRED WHEEL.
No. 602,346. Patented Apr. 12, 1898.
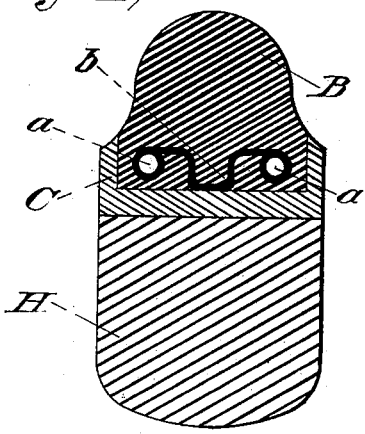
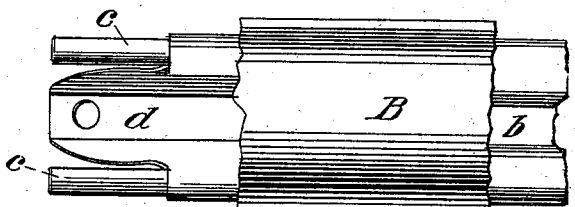
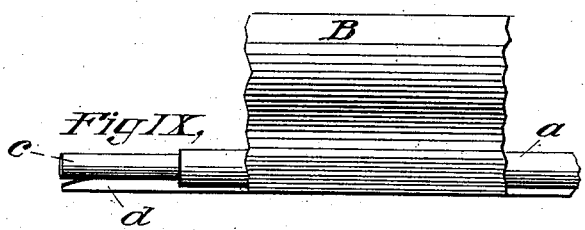
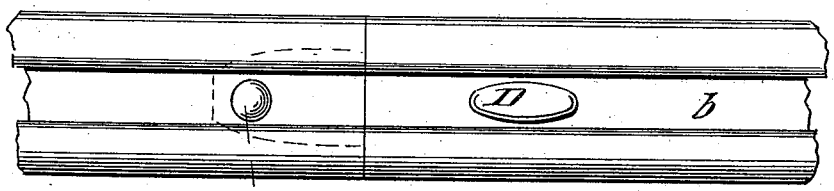
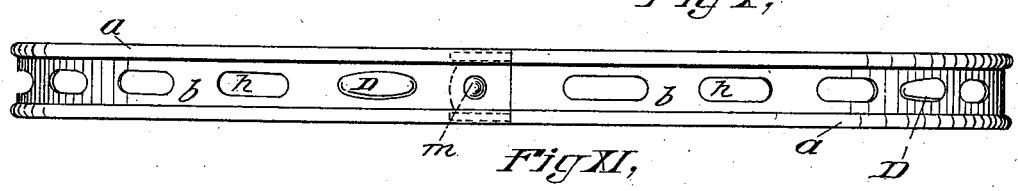
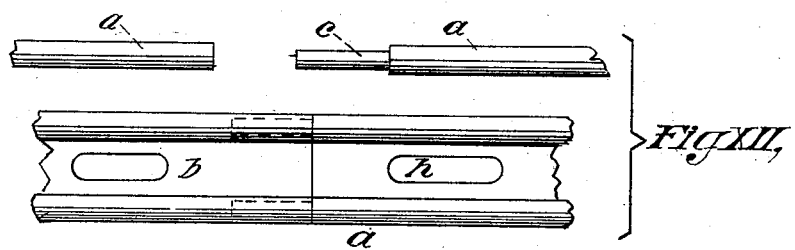
Witnesses,
Penn Tyler
Jason Perkins
Inventor,
Charles A. Maynard
by his attorney
F. F. Hyde

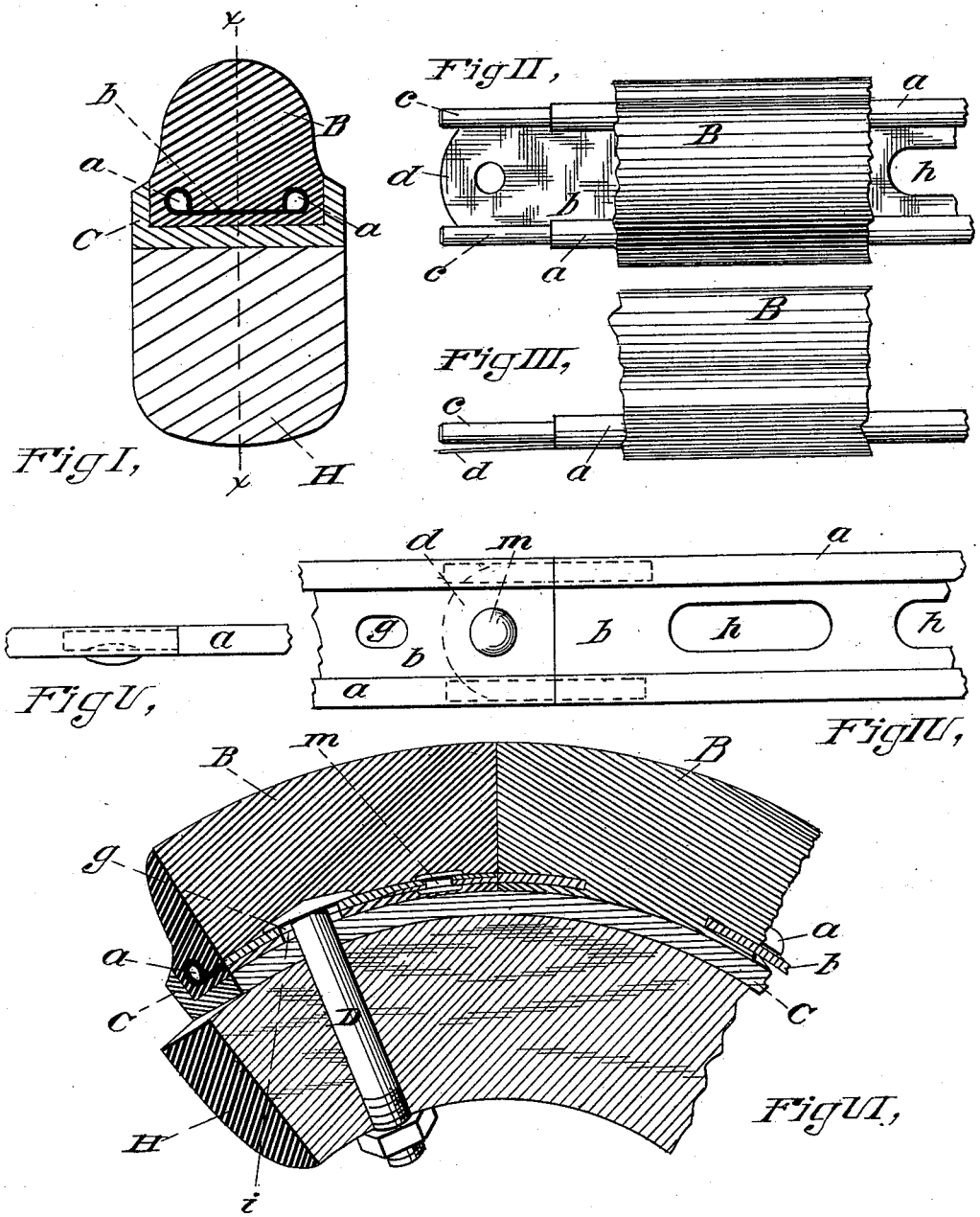

UNITED STATES PATENT OFFICE.

CHARLES A. MAYNARD, OF SPRINGFIELD, MASSACHUSETTS.

RUBBER-TIRED WHEEL.

SPECIFICATION forming part of Letters Patent No. 602,346, dated April 12, 1898.

Application filed January 10, 1898. Serial No. 666,196. (No model.)

*To all whom it may concern:*

Be it known that I, CHARLES A. MAYNARD, a citizen of the United States of America, and a resident of Springfield, Hampden county, State of Massachusetts, have invented certain new and useful Improvements in Rubber-Tired Wheels, of which the following is a specification.

My invention relates to improvements in rubber-tired wheels; and it especially relates to wheels designed for use on ordinary vehicles—such as wagons, buggies, and carriages—the object of the improvements being to provide a secure means of attaching the tire to the rim; and the invention consists in the combination and construction, as hereinafter described, and more particularly pointed out in the claims.

In the drawings fully illustrating my invention, Figure I is a transverse section of a felly, rim, and tire and through the retaining-band to one side of its coupling. Fig. II is a top plan view of one end of a retaining-band and of a segment of tire inclosing the band. Fig. III is a side elevation of the parts shown in Fig. II. Fig. IV is a plan view of the coupled ends of a retaining-band. Fig. V is a side elevation of said coupling. Fig. VI is a vertical section of a segment of a felly, rim, a retaining-band, and tire on the dotted line $xx$ of Fig. I and with the ends in perspective in transverse section and showing contiguous ends of the tire and retaining-band coupled. Fig. VII is the same as Fig. I with a modified retaining-band. Fig. VIII shows in plan view one end of the retaining-band shown in Fig. VII combined with a segment of tire. Fig. IX is a side elevation of Fig. VIII. Fig. X is a plan view of the coupled ends of the modified retaining-band. Fig. XI is a perspective, in reduced size, of the coupled retaining-band shown in Fig. I; and Fig. XII is a modification of the couplings of the retaining-band shown in the other views.

Referring to the drawings, $a\,a$ are two metal tubes united by a metallic web $b$. The tubes $a\,a$ are seated in the rubber tire B to be equidistant from its vertical center and at equal distances from its base. The tubes when their ends are coupled form an arch of great strength relative to the weight of material contained by them to resist any displacement of the tire in a vertical direction, and the web uniting them forms a strut or tie to, with the tubes, constitute a truss to resist all lateral compression or displacement of the tire relative to the rim C, as well as any change of position of the tubes relative to each other.

In practice a sheet of metal of the required width and length and of uniform thickness has its edges bent to form the tubes and leave the intermediate web, the outer edges of the strip being turned in, so as to leave no edge to cut the rubber of the tire. The result of a retaining-band so constructed is the combination of strength with lightness and a uniform distribution of resistance to the displacement of the tire at any part of it; also, the provision of means for coupling the ends of the retaining-band in a perfectly secure manner and without an increase of size at the joint to cause an abrading-surface to the rubber or a weak spot therein due to a reduced thickness thereof.

To form the coupling at the tubes of one end of the retaining-band, dowels-pins $c\,c$ are inserted and secured therein by being welded or soldered to leave projecting ends, as shown in Figs. II and III. These projecting pins just fit into the tubes of the corresponding end of the retaining-band, and when the two ends are brought together, as seen more particularly in Fig. XII, and the pins welded in the joined tubes the shoulders formed by the tube ends and ends of the web abut in a perfect prolongation of each other and no increase of size at the joint is produced.

As an additional means of coupling the ends where facilities for electrically welding the pins in the tube ends do not exist the end of the web of one section of the joint is shown prolonged to form a tongue, which comes against the corresponding end of the other web-section and is riveted or bolted to it through corresponding holes left in the two ends. If desired, the two surfaces thus secured may be filed down, as shown in Fig. VI, to have the same thickness when combined that the body of the web has away from the joint, and this tongue may be employed as additional security, in combination with the pins c c, welded in opposing tube ends of the retaining-band.

Where a rivet is used, as shown in Figs. IV, V, and X, the rounded heads of the rivet are little in relief from the web and cannot much disturb the tire at that point, although it is better to have the retaining-band perfectly uniform in size throughout.

In Fig. I, where the retaining-band is shown embedded in the tire B, it is seen that the tire is held from being pressed away from the sides of the rim C by the tubes a, rigidly braced transversely by the web b, and the difficulty with the most successful vehicle-tires at present is that gravel and dirt get between the rim and the tire and soon wear the tire out, while with other retaining-bands in use edges of the band itself present cutting or abrading surfaces to the rubber, both of which difficulties are obviated by this form of construction.

In the modification of the retaining-band shown in Figs. VII, VIII, IX, and X the web b in place of being a flat band is corrugated to leave a central longitudinal portion bearing directly upon the rim C, while the tubes a a, attached to its opposite sides, are inclosed in the rubber of the tire and in the same relative position therein occupied by the tubes in the band shown in Fig. I. The tire is held by the tubes from being forced away from the rim sides, and the configuration of the band, as shown in cross-section in Fig. VII, prevents the tire from spreading at the bottom outward from the center. The principal advantage of this form of construction of the band is that where an imperfect section of a tire is to be removed without changing the position of an entire retaining-band relative to the tire the imperfect section may be cut out and replaced easily by the new piece being forced into position between the retaining-band and the rim, as a section could not easily be where the retaining-band was entirely embedded in the tire.

In the web, as shown more particularly in Figs. IV and XI, is provided a series of openings h, which permit the rubber to extend to both sides of the web through the web and so anchor the tire to the retaining-band that there can be no creeping of the tire.

In Fig. VI the rubber of the tire is shown extending through one opening h of the web, and in Fig. XI a plurality of said openings are shown.

In practice the bolts D, clamping the tire, rim, and felly together, generally have their heads connected with the retaining bands or devices inclosed by the rubber vulcanized over them, their stems projecting to enter coinciding holes in the rim and felly; but there is often difficulty in getting the bolts so attached to the tire to come in their proper spacing to enter said holes, to obviate which difficulty I provide elongated holes g in the web b and provide corresponding elongated openings i in the tire, through which the stem of the bolt D passes. The bolts D are provided with T-shaped heads that at each end overlap the openings g and i a sufficient distance to permit a play of the stem within said openings, while always bearing above them, so that if the bolts do not at once coincide with their holes in the rim and felly they may be moved in the tire to do so, the clamping pressure of the bolt-head on the web of the retaining-band being sufficient to hold the tire from any movement on the rim. In the form of web shown in Fig. VII it would be sufficient to have the elongated hole in the web alone.

In the drawings, d is the tongue from one end of the web, overlapping the contiguous end at the joint of the coupling. m is the rivet securing the tongue, and H is the felly.

Now, having described my invention, what I claim is—

1. A felly, a rim arranged on the felly and provided with side flanges, a rubber tire seated in the rim, and a metal retaining-band combined with the tire by being embedded therein, and comprising two tubes lying within the rim-flanges on opposite sides of the vertical center of the tire and united by a web, means for coupling the ends of the retaining-band, and bolts passing through the web and clamping it to the rim and felly.

2. A felly, a rim arranged thereon and provided with side flanges, a rubber tire seated on the rim, a metal retaining-band combined with the tire and comprising two side tubes tied together by an intermediate web, said tubes inclosed by the tire on opposite sides of its vertical center, a coupling consisting of dowel-pins within the abutting tube ends and fast to both and forming a coupling maintaining a uniform and unbroken exterior to the retaining-band, and bolts for uniting tire, rim and felly.

3. A felly, a rim thereto provided with side flanges for seating the tire, a retaining-band for holding the tire to the rim, and comprising a metal band with its opposite edges turned over to form tubes and an intermediate portion left as a web between the tubes, and combined with the tire by having the tubes inclosed therein on opposite sides of its vertical center, means for coupling the ends of the retaining-band, and means for securing tire, rim and felly together.

4. The combination of a felly, flanged rim seated thereon, rubber tire seated in the rim, metal retaining-band comprising side tubes inclosed in the tire and intermediate web, bolt with its head bearing upon the web and stem passing through rim and felly, and elongated hole in the web beneath the bolt-head of greater diameter than the bolt-stem and of less diameter than its head, whereby the bolt may be slid under the rubber for adjustment as described.

5. The metal retaining-band comprising two side tubes and connecting-web, and adapted to be combined with a rubber tire to have the tubes inclosed therein on each side of its vertical center; and a joint for the band ends comprising pins received in both ends of the joined tubes and made fast to both, and a tongue from the web of one member adapted to rest against and be secured to the web of the other member.

Signed by me, at Springfield, this 8th day of January, 1898.

CHARLES A. MAYNARD.

Witnesses:
R. F. HYDE,
PENN TYLER.